US011133768B1

(12) United States Patent
Jeong et al.

(10) Patent No.: US 11,133,768 B1
(45) Date of Patent: Sep. 28, 2021

(54) SYSTEM, FOR MOTOR CONTROL CENTER, HAVING A DUAL STRUCTURE OF INTEGRATED MODULES AND COMMUNICATION

(71) Applicant: ROOTECH INC., Suwon-si (KR)

(72) Inventors: Changyong Jeong, Suwon-si (KR); Youngbok Byun, Yongin-si (KR); Boogi Moon, Hwaseong-si (KR); Dongchun Ji, Yongin-si (KR)

(73) Assignee: ROOTECH INC., Suwon-si (KR)

( * ) Notice: Subject to any disclaimer, the term of this patent is extended or adjusted under 35 U.S.C. 154(b) by 501 days.

(21) Appl. No.: 16/321,647

(22) PCT Filed: Aug. 10, 2017

(86) PCT No.: PCT/KR2017/008655
§ 371 (c)(1),
(2) Date: Jan. 29, 2019

(87) PCT Pub. No.: WO2018/038431
PCT Pub. Date: Mar. 1, 2018

(30) Foreign Application Priority Data

Aug. 22, 2016 (KR) ........................ 10-2016-0105917

(51) Int. Cl.
*H02P 1/02* (2006.01)
*H04L 12/40* (2006.01)
*H02P 29/02* (2016.01)

(52) U.S. Cl.
CPC .............. *H02P 29/02* (2013.01); *H04L 12/40* (2013.01)

(58) Field of Classification Search
CPC .... H02H 7/0822; H02J 9/066; H02J 13/0062; H04L 12/40; H02P 1/02; H02P 1/029
See application file for complete search history.

(56) References Cited

U.S. PATENT DOCUMENTS 8,144,438 B2 * 3/2012 Rivers, Jr. ........... H02J 13/0017
361/23
8,984,204 B2 * 3/2015 Stucchi ............ H02J 13/00034
710/312

(Continued)

FOREIGN PATENT DOCUMENTS

JP      2016-036230 A    3/2016
KR      20-0431602 Y1   11/2006

(Continued)

*Primary Examiner* — Thai T Dinh
(74) *Attorney, Agent, or Firm* — Rabin & Berdo, P.C.

(57) ABSTRACT

A motor control center system according to the present invention includes a first integrated module and a second integrated module which are provided in correspondence with a motor control center and in a dual structure; a plurality of protection control modules provided in correspondence with respective motor units; and a multipoint bus to which the protection control modules are connected such that a serial communication network is formed between the first integrated module and second integrated module and the plurality of protection control modules, wherein one end of the multipoint bus is commonly connected to a first serial communication port of the first integrated module and a first serial communication port of the second integrated module, and the other end of the multipoint bus is commonly connected to a second serial communication port of the first integrated module and a second serial communication port of the second integrated module.

14 Claims, 11 Drawing Sheets

(56) References Cited

U.S. PATENT DOCUMENTS

| | | | | |
|---|---|---|---|---|
| 10,698,468 B2 * | 6/2020 | Kim | ................... | G06F 3/04817 |
| 2006/0109611 A1 * | 5/2006 | Lang | ...................... | H02H 7/261 |
| | | | | 361/605 |
| 2008/0258667 A1 * | 10/2008 | Morris | ..................... | G01R 1/04 |
| | | | | 318/490 |

FOREIGN PATENT DOCUMENTS

| | | |
|---|---|---|
| KR | 10-1177794 B1 | 8/2012 |
| KR | 10-1262163 B1 | 5/2013 |
| KR | 10-1455351 B1 | 10/2014 |

\* cited by examiner (a)

(b)

SYSTEM, FOR MOTOR CONTROL CENTER, HAVING A DUAL STRUCTURE OF INTEGRATED MODULES AND COMMUNICATION

TECHNICAL FIELD

The present invention relates to a motor control center system having a dual structure of an integrated module and internal communication while reducing the complexity of a process when applying the dual structure to integrated module and internal communication in the motor control center.

BACKGROUND ART

The motor control center (MCC) includes a basic unit (hereinafter, also referred to a 'motor unit' on the basis that the unit is related to each motor) constituted of a circuit breaker, a switchgear, a protection control module, etc. to control, stop, and protect the motor and an inlet unit constituted of a main line for supplying power to a branch line of each basic unit, a circuit breaker, and the like (See FIG. 1).

The protection control module, which is one of the components constituting the motor unit, may be configured separately as a protection device and a control device and is applied to various products ranging from a simple function device to a high function device with a communication function.

A digital protection control module having a communication function has been widely used, and the motor control center, for example, is configured as shown in FIG. 2, as it is necessary to be controlled in front of the MCC panel and controlled remotely from a central control room in the case of a factory or a building.

However, such a communication configuration has problems that the unique IP and ID should be allocated to each protection control module of each motor unit, and thus management complexity increases when multiple MCCs are installed.

Accordingly, the inventor of the present invention has invented a system for a motor control panel having a configuration shown in FIG. 3. By applying an integrated module communicatively connected to the protection control modules of the motor unit to the inlet unit of the MCC, the integrated module is responsible for communicating with all the protection control modules, in which a computer or a PLC of the central control room communicates with only one integrated module for each MCC, thereby improving management efficiency.

However, in the configuration as shown in FIG. 3, the reliability and stability of the integrated module installed in the inlet unit become very important. When the protection control module installed in each motor unit fails, loss of control of only one motor may occur. However, when the integrated module of the inlet unit fails, the communication with the upper system is disconnected, or there is a problem in communication function with the protection control module, it is possible to cause a serious situation in which all the motors connected to the MCC cannot be remotely controlled.

In order to improve the reliability, a dual structure is required. However, in the case of the MCC, the integrated module of the inlet unit and all the protection control modules of the respective motor units have to be in a dual structure, which results in an excessive increase in the cost of the MCC configuration and is thus a practical limitation.

One proposed method is to have only the integrated module of the inlet unit in a dual structure to prevent simultaneous loss of control of all the motors connected to the MCC from. Accordingly, when the integrated module of the inlet unit is in a dual structure, the communication wiring diagram is as shown in FIG. 4.

Two integrated modules of an inlet unit connected to an upper system via an Ethernet act as active/standby device. When an active device fails, the function of the active unit is taken over by the standby device.

The communication between the integrated module of the inlet unit and the protection control module of the motor unit is connected from a communication terminal of one of the integrated modules, for example, the active device, to a communication terminal of the standby device through each protection control module.

When an active device fails while the active device communicates with the protection control modules, the standby device communicates with each protection control module. In the drawing, the branch connector can use a general branch connector in which three sockets are internally connected in parallel.

When the integrated module of the inlet unit and the protection control modules of the motor unit are communicatively connected in this structure, there is no problem in a dual function of the integrated module. However, when the internal communication line is disconnected, motor control can be partially lost. In this case, a proposed solution is that the active device and the standby device share the communication.

For example, as shown in FIG. 5, when a disconnection occurs between the protection control module No. 4 and the protection control module No. 5, the active device can communicate only with the protection control modules Nos. 1 to 4, so that the standby device communicates with the protection control modules Nos. 5 to 10.

The active device can communicate with all the protection control modules with the aid of the standby device active device but cannot operate to be switched like a normal active/standby, and the active device and the standby device are in a sharing manner so that complex cooperative functions must be implemented between the active device and the standby device, whereby there is a problem that the process becomes complicated.

In addition, when any one of the active device and the standby device fails and at the same time the internal communication line is disconnected, there arises a problem that it is impossible to communicate with the protection control module, which is required to communicate with the device having the failure.

While the present invention has been described with reference to exemplary embodiments, it is to be understood that the invention is not limited to the disclosed exemplary embodiments.

DISCLOSURE

Technical Problem

An object of the present invention is to provide a motor control center system, having a dual structure of integrated modules and internal communication while reducing the complexity of a process.

In addition, the present invention is to provide a motor control center system, in which integrated modules and internal communication are in a dual structure simultaneously.

Technical Solution

A motor control center system according to an aspect of the present invention includes: a first integrated module and a second integrated module which are provided in correspondence with a motor control center and in a dual structure; a plurality of protection control modules which are provided in correspondence with respective motor units; and a multipoint bus to which the plurality of protection control modules are connected such that a serial communication network is formed between each of the first integrated module and second integrated module and the plurality of protection control modules, wherein one end of the multipoint bus is commonly connected to a first serial communication port of the first integrated module and a first serial communication port of the second integrated module, and the other end of the multipoint bus is commonly connected to a second serial communication port of the first integrated module and a second serial communication port of the second integrated module.

A motor control center system according to an aspect of the present invention includes a first integrated module and a second integrated module which are provided in correspondence with a motor control center and in a dual structure; and a plurality of protection control modules which are provided in correspondence with respective motor units, wherein a serial communication network is formed between each of the first integrated module and second integrated module and the plurality of protection control modules, a first ring is configured to start from a first serial communication port of the first integrated module and return to a second serial communication port of the first integrated module, and a second ring is configured to start from a first serial communication port of the second integrated module and return to a second serial communication port of the second integrated module, and a section including a point where the plurality of protection control modules are connected at least in the first ring, and the second ring is shared to become a single multipoint bus.

In the motor control center system, a bridge socket may be used for each of the two common connections, and the bridge socket includes at least three sockets, in which corresponding terminals used for serial communication in the at least three sockets are internally connected to each other.

In the motor control center system, one of the first integrated module and the second integrated may operate as an active module, and the other may operate as a standby module, heartbeat communication may be performed between the active module and the standby module, and when an abnormality occurs in the active module, a function of the active module may be taken over by the standby module.

In the motor control center system, the first integrated and the second integrated module may perform IP communication with an upper layer, and when an abnormality occurs in the active module, an IP address of the standby module may be switched to an IP address used by the active module.

In the motor control center system, when the multipoint bus is disconnected at one point, the protection control modules connected to one side of the multipoint bus on the basis of the disconnected point may perform communication using the first serial communication port of the active module, and the protection control modules connected to the other side of the multipoint bus may perform communication using the second serial communication port of the active module.

In the motor control center system, the protection control module may be connected to the multipoint bus using a unit socket, and the unit socket may include a first socket and a third socket connected to both ends in a direction in which the multipoint bus is extended and a second socket connected to any one protection control module of the plurality of protection control modules, and switch between a first state in which corresponding terminals of the first socket and the third socket are connected directly to each other inside the unit socket and a second state in which corresponding terminals of the first socket and third socket are connected via the any one protection control module.

In the motor control center system, the switching between the first state and the second state may by performed by a solenoid switch operated by a power source supplied from the protection control module.

Advantageous Effects

According to one aspect of the present invention, there is an advantage that it is possible to provide a dual structure of integrated modules and internal communication while reducing the complexity of process.

In addition, according to one aspect of the present invention, there is an advantage that integrated modules and internal communication can be in a dual structure simultaneously.

BEST MODE

Figure 1:
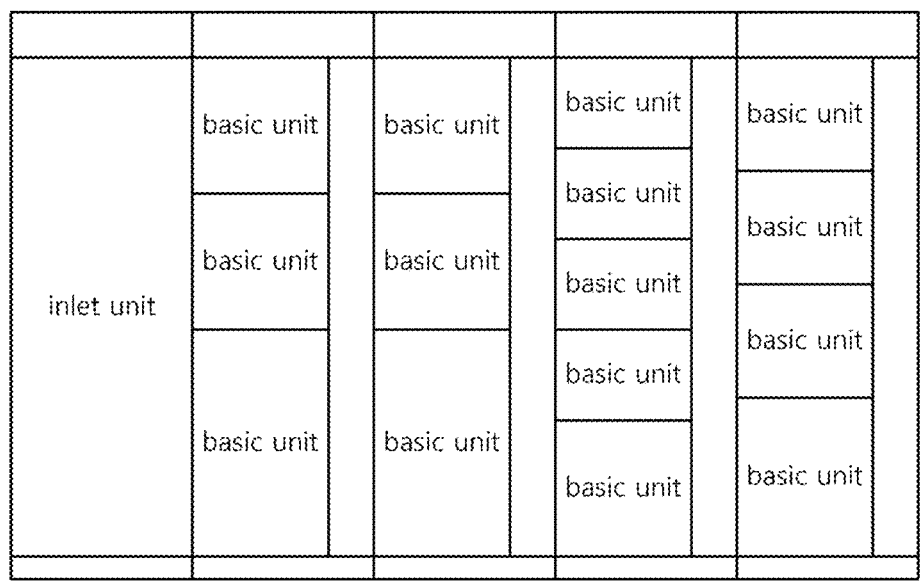
FIG. 1 is a view showing a configuration of a general motor control center.
Figure 2:
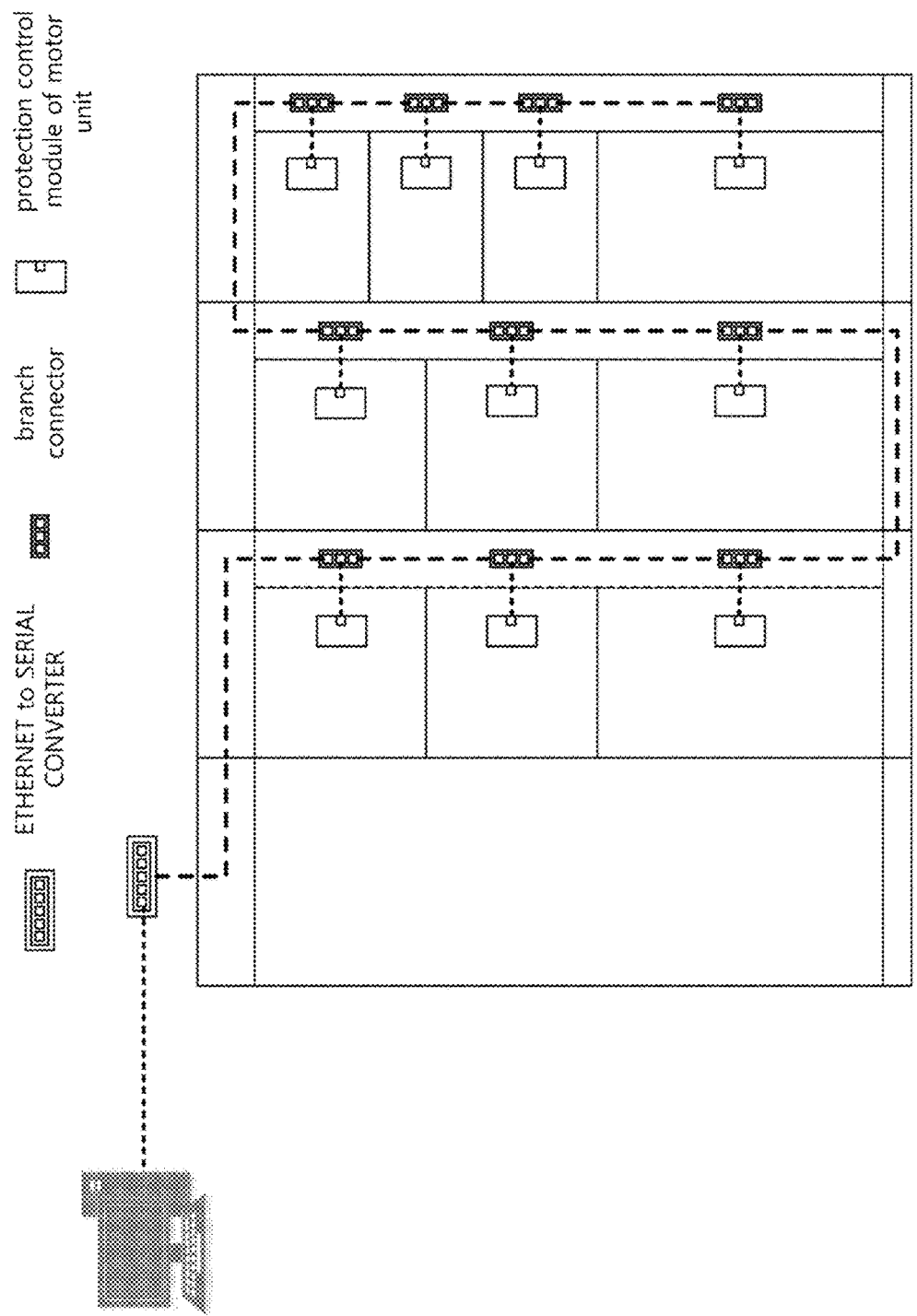
FIG. 2 is a view illustrating a state in which a computer in a central control room and each protection control module are connected via communication.
Figure 3:
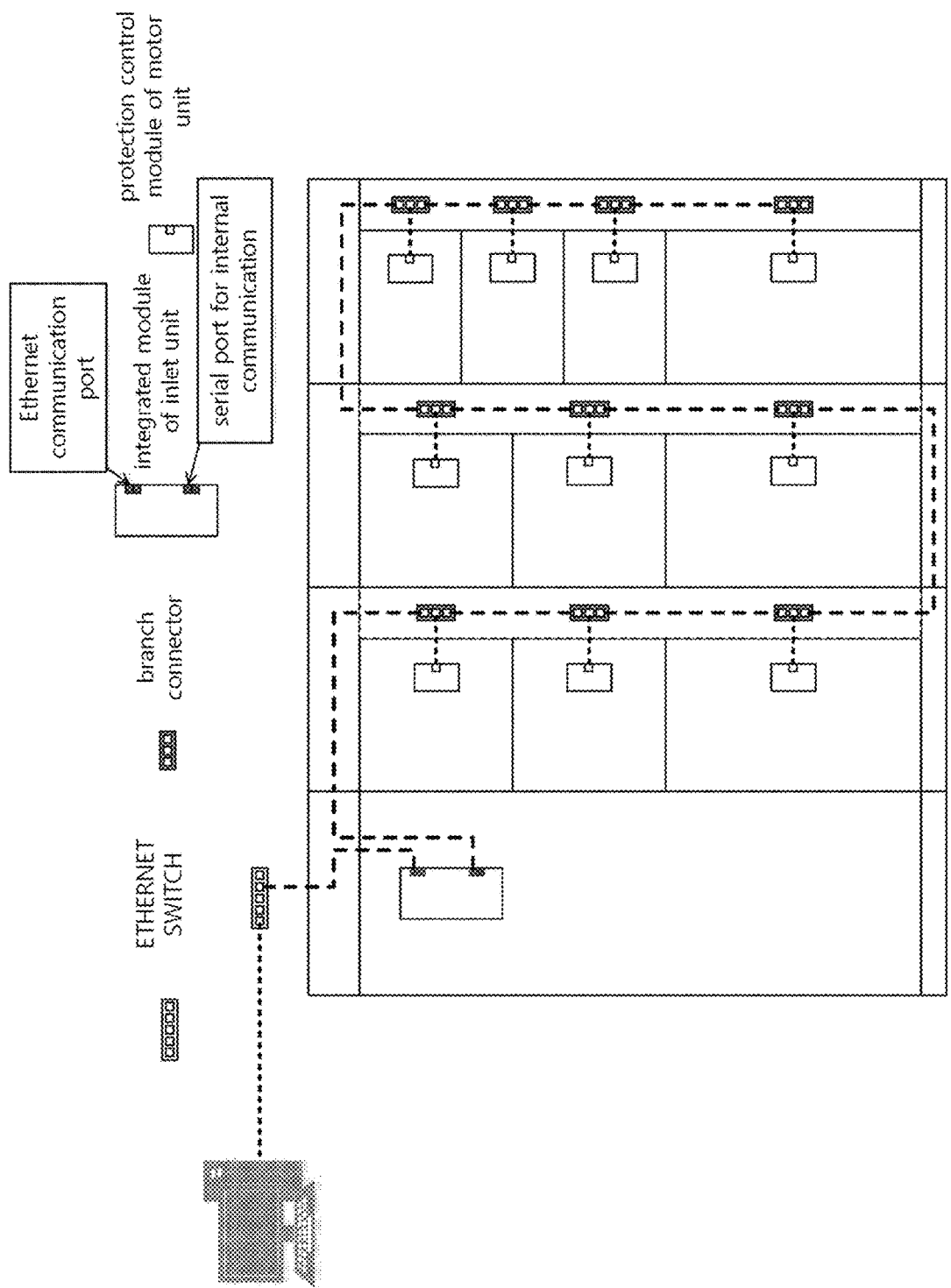
FIG. 3 is a view illustrating an example of a motor control center system proposed by the present inventor, in which an integrated module communicatively connected to protection control modules of a motor unit is applied to an inlet unit so that the integrated module is responsible for performing communication with all protection control modules.
Figure 4:
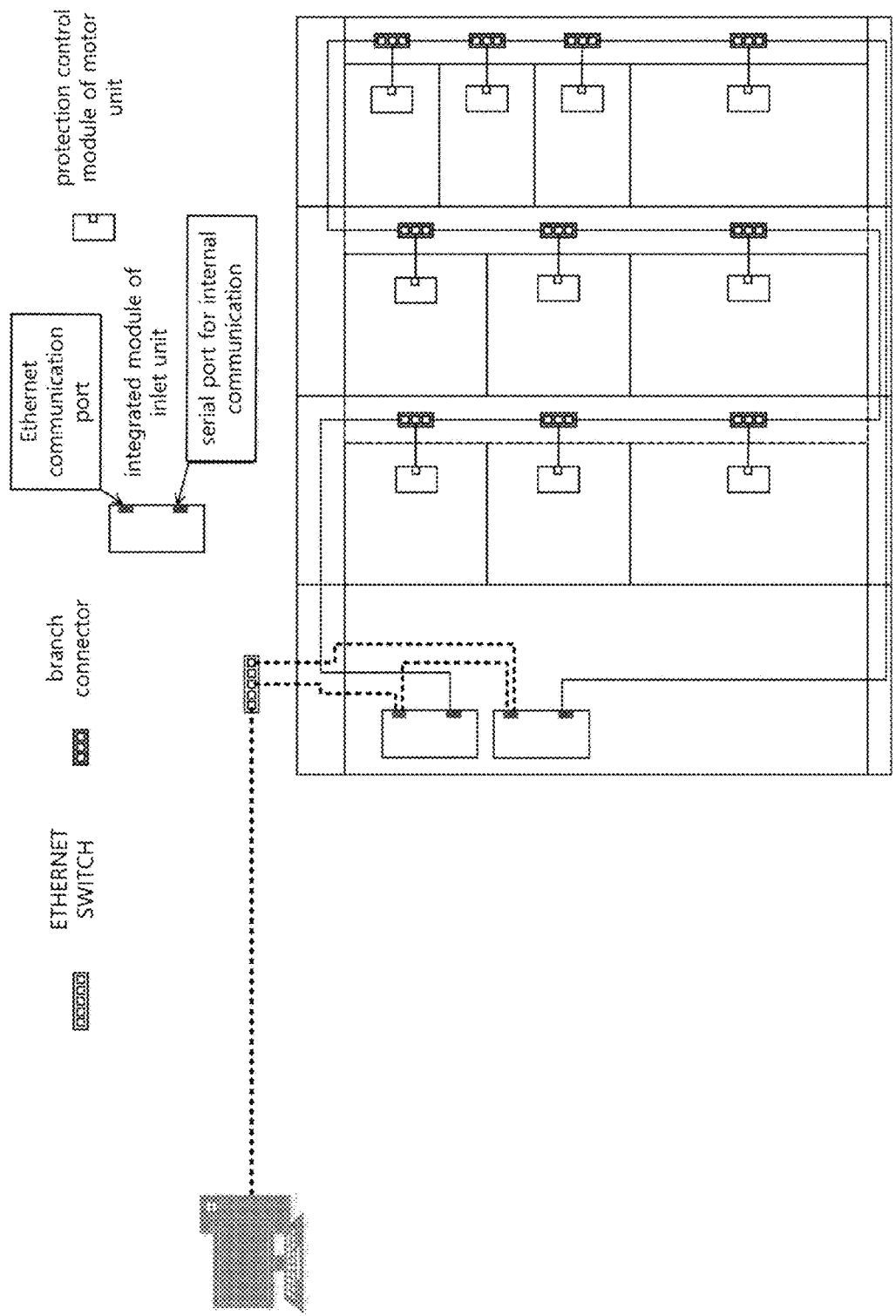
FIG. 4 is a view illustrating an example of a motor control center system proposed by the present inventor, in which an integrated module of an inlet unit is in a dual structure.

The above and other features and advantages of the present invention will become more apparent by describing in detail exemplary embodiments thereof with reference to the attached drawings. The present invention may, however, be embodied in many different forms and should not be construed as limited to the embodiments set forth herein. In order to clearly illustrate the present invention, parts not related to the description are omitted, and similar names and reference numerals are used for similar parts throughout the specification. Particularly, the matters described in the preceding embodiments can be omitted from the description of the subsequent embodiments.

Figure 6:
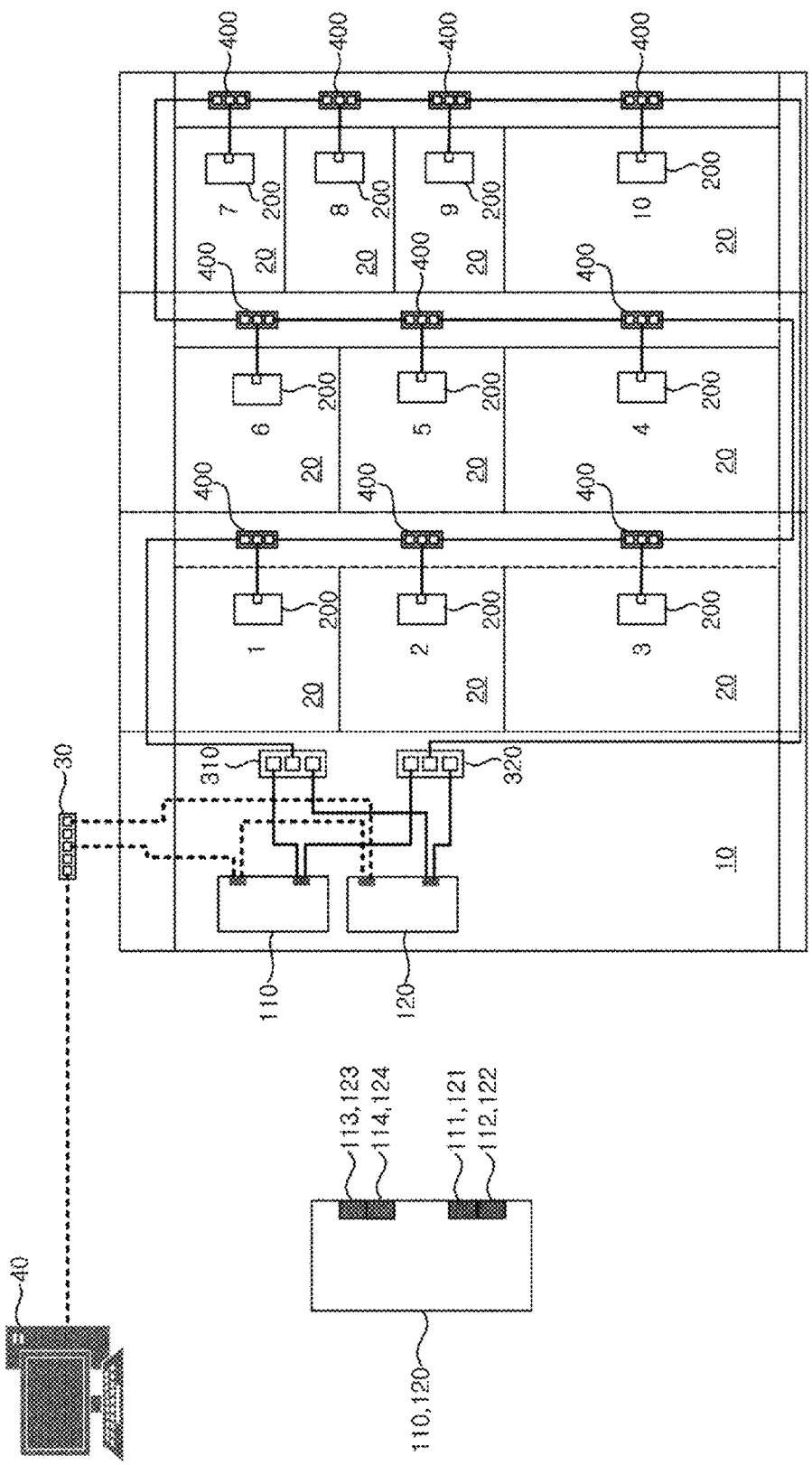
FIG. 6 is a view illustrating a configuration of a motor control center system according to an embodiment of the present invention.
Figure 7:
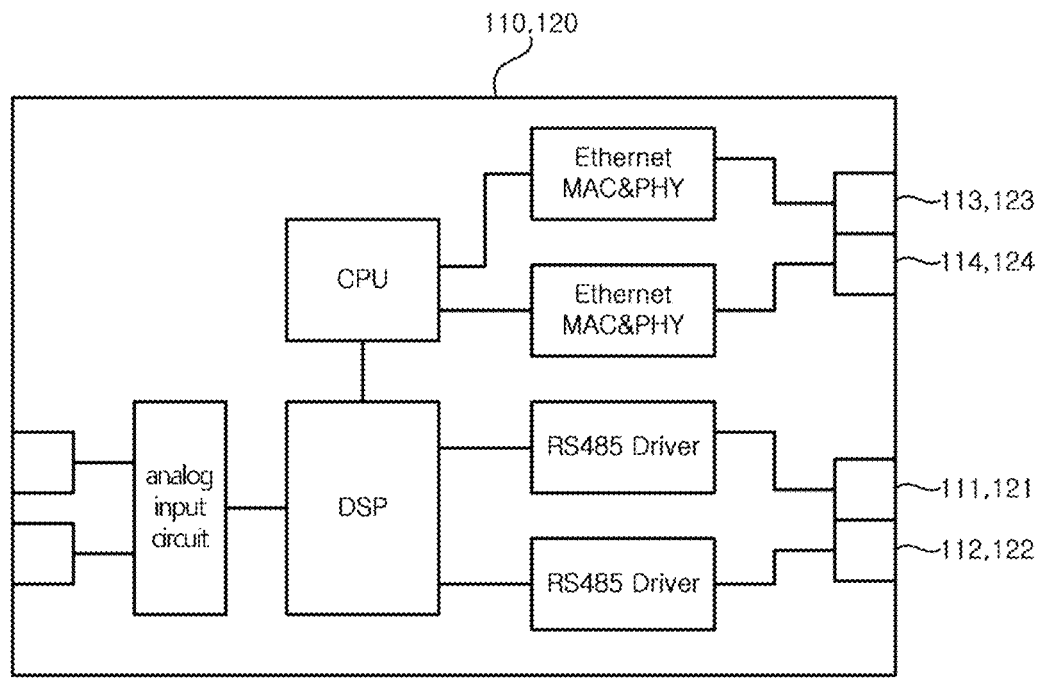
FIG. 7(*a*) is an internal block diagram of integrated module 110 and 120, and FIG. 7 (*b*) is an internal block diagram of a protection control module 200.
Figure 7:
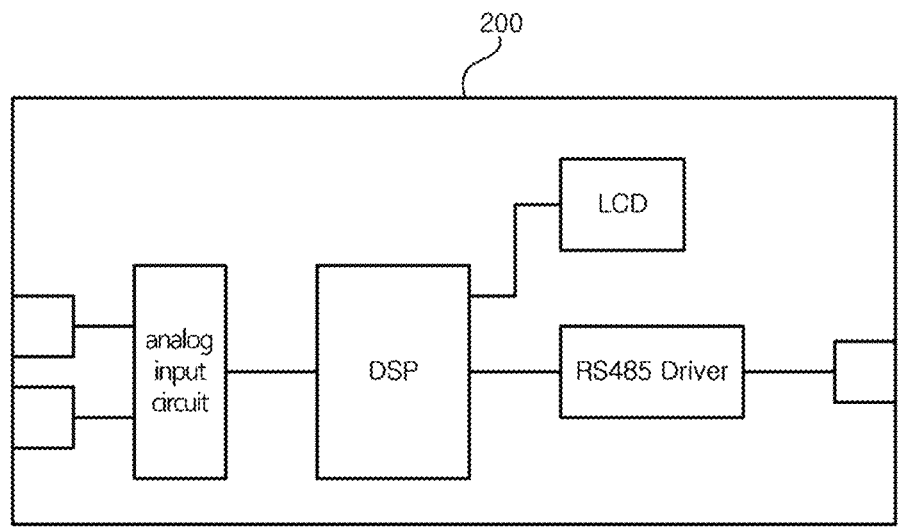
Figure 8:
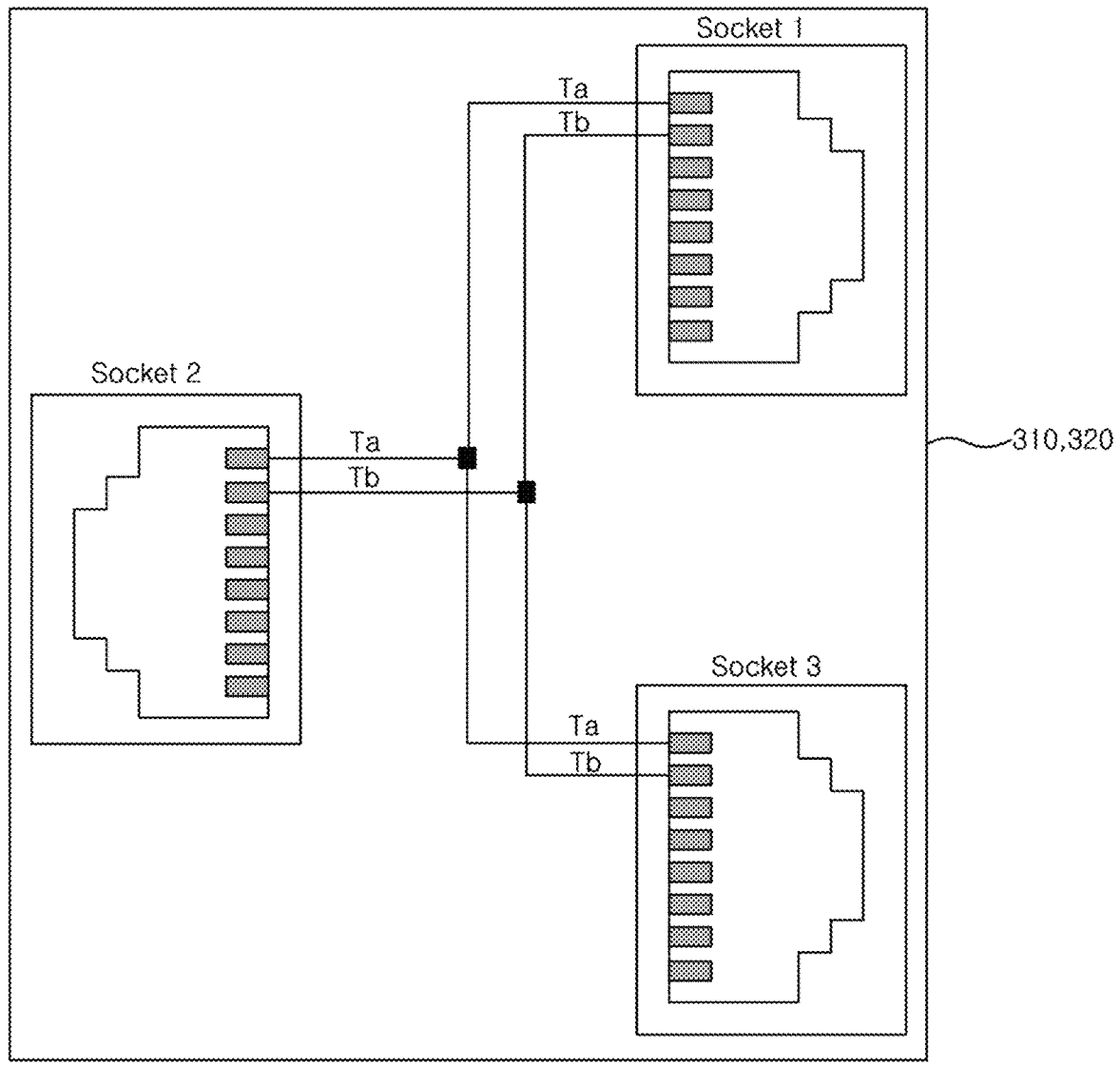
FIG. 8 is an internal configuration diagram of bridge sockets 310 and 320.
Figure 9:
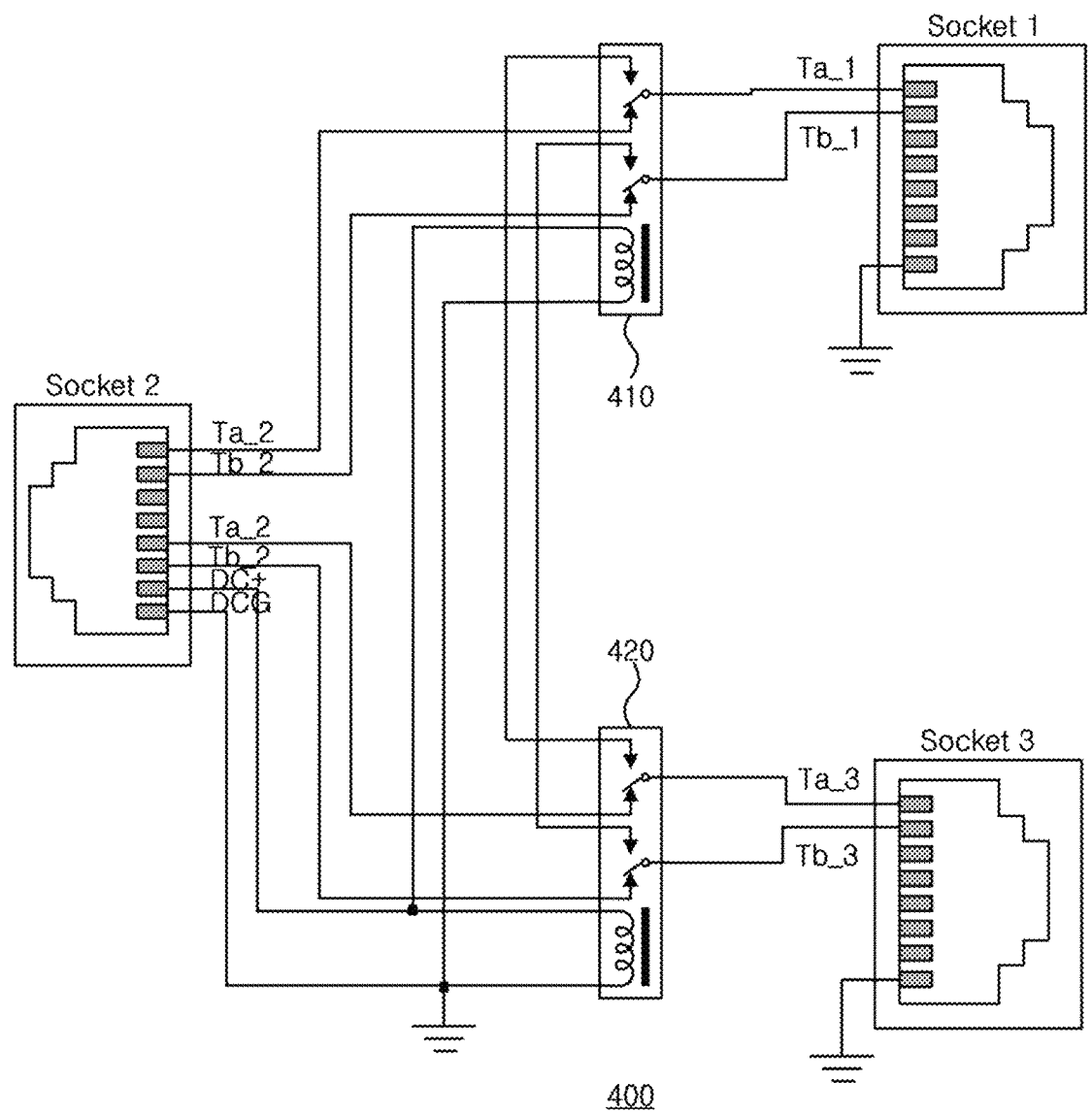
FIG. 9 is an internal configuration diagram of a unit socket 400.
Figure 11:
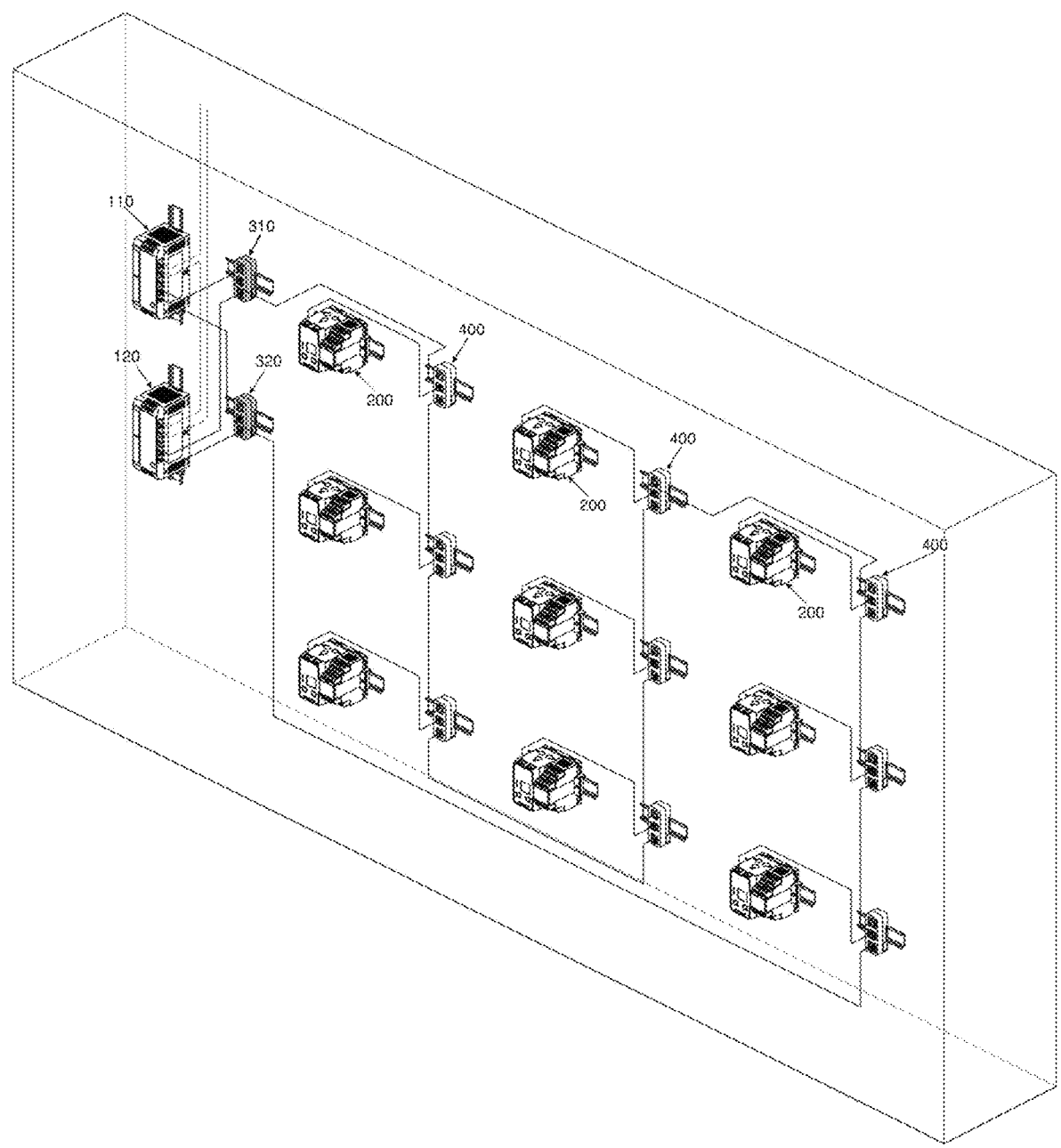
FIG. 11 is a perspective view illustrating a motor control center system according to an embodiment of the present invention shown in FIG. 6.

FIG. 6 is a view illustrating a configuration of a motor control center system according to an embodiment of the present invention, FIG. 7(a) is an internal block diagram of integrated module 110 and 120, and FIG. 7 (b) is an internal block diagram of a protection control module 200. FIG. 8 is an internal configuration diagram of bridge sockets 310 and 320, and FIG. 9 is an internal configuration diagram of a unit socket 400. FIG. 11 is a perspective view illustrating a motor control center system according to an embodiment of the present invention shown in FIG. 6.

A motor control center system is configured to include a first integrated module 110 and a second integrated module 120 that are provided in an inlet unit 10 in correspondence with the motor control center and in a dual structure; a plurality of protection control modules 200 provided in correspondence with respective motor units 20; a upper system 40 which is a computer or a PLC of a central control room; an Ethernet switch 30 for communication between the upper system 40 and the integrated modules 110 and 120 of the motor control center; two bridge sockets 310 and 320 for connection between the first integrated module 110 and the second integrated module 120 and a multipoint bus; and a plurality of unit sockets 400 allowing each protection control module 200 to be connected to the multipoint bus.

The first integrated module 110 and the second integrated module 120 may include two Ethernet drivers (Ethernet MAC & PHY) for communication with the upper system 40 such as the computer or the PLC of the central control room or Ethernet communication with each other, two RS-485 drivers for internal serial communication, an analog input circuit for inputting signals from a potential transformer (PT) and a current transformer (CT) to be connected, a DSP signal for signal processing of an analog signal, and a CPU for control and calculation (see FIG. 7(a)).

One of the first integrated module 110 and the second integrated module 120 operates as an active module and the other operates as a standby module. Heartbeat communication is performed between the active module and the standby module via Ethernet. When an active module fails, a function of the active module is taken over the standby module. For example, the heartbeat message may include a signal or information to be transmitted to the standby module when the active module is operating normally.

In the case that the first integrated module 110 and the second integrated module 120 perform IP communication with the upper system 40, when there is an abnormality in the active module, an IP address of the standby module is switched to an IP address used by the active module.

The first integrated module 110 and the second integrated module 120 receive and transmit control commands from the upper system 40 and to the respective protection control module 200, and data on current, voltage (voltage data may be received from the integrated module), power, and the like collected and generated by each protection control module 200, and status data of each protection control module 200 are collected from each protection control module 200 and reported to the upper system 40. In addition, the first integrated module 110 and the second integrated module 120 collect data on the voltage and current of the main line using the connected PT and CT and report the collected data to the upper system 40, and the voltage data of the main line is transmitted to the protection control module 200 and thus used by the protection control module 200 to perform power calculation and the like.

The protection control module 200 may include a RS-485 driver for serial communication with the integrated module, a LCD for displaying information, an analog input circuit for inputting signals from PT and CT connected or embedded (since the voltage data may be received from the integrated module, the analog input circuit for PT and CT may be omitted), and a DSP for performing processing, calculation, and control of an analog signal (See FIG. 7(b)).

The protection control module 200 is installed in the motor unit together with a circuit breaker, a switch, and the like for protection (or operation and stop control) of the motor and controls the switch according to an instruction from the integrated module or self judgement. The protection control module 200 acquires current data of the branch line using the CT connected or embedded, acquires voltage data of the branch line using the PT connected or embedded, receives the voltage data from the integrated module, collects and generates data on voltage, current, power, and the like using the received data, and transmits the collected and generated data to the integrated module.

The first bridge socket 310 and the second bridge socket 320 are used to allow the first integrated module 110 and the second integrated module 120 to be commonly connected to a multipoint bus configured for serial communication with each protection control module.

The bridge sockets 310 and 320 have at least three sockets, and corresponding terminals used for serial communication are internally connected to each other in the at least three sockets (see FIG. 8). Terminals Ta used for serial communication are internally connected to each other and terminals Tb are internally connected to each other in a first socket Socket 1, a second socket Socket 2, and a third socket Socket 3 of the bridge socket.

A unit socket 400 is used to connect each protection control module 200 to the multipoint bus. The unit socket 400 may be identical to the structure of the bridge socket described above.

However, since the motor control center is configured so that a user may draw out the motor unit, the protection control module of the motor unit is located in the motor unit and the unit socket 400 is located outside the motor unit. Accordingly, the communication line between the second socket Socket 2 of the unit socket and the protection control module 200 constitutes a stub, and a length of the stub may be 1 meter to 3 meters or more. Most motor units assembled at the motor control center constitute such a stub. There are problems in that such a long stub causes an impedance mismatch and thus a reflection of a signal, which results in increasing the possibility of occurrence of a communication failure.

In order to solve such a problem, the unit socket 400 may be configured as shown in FIG. 9. The unit socket 400 according to an embodiment of the present invention includes the first socket Socket 1 and the third socket Socket 3 connected to both ends in a direction in which the multipoint bus is extended and the second socket Socket 2 connected to any one protection control module of a plurality of protection control modules 200.

Solenoid switches 410 and 420 receive control power from the protection control module 200 through a terminal DC+and a terminal DCG of the second socket Socket 2 and is operated by the control power to switch between a first state and a second state. The first state is a state in which the corresponding terminals of the first socket and the third socket are directly connected to each other inside the unit socket 400, and the second state is a state in which the corresponding terminals of the first socket and the third socket are connected to each other via the any one protection control module.

The protection control module 200 and the unit socket 400 are connected to each other by a cable having a plug at both ends thereof and each have a signal line corresponding to each terminal of the second socket Socket 2 shown. The signal lines constituting the cable includes a signal line (i.e., a signal line connected to the first solenoid switch 410) connected to the first socket, a signal line (i.e., a signal line connected to the second solenoid switch 420) connected to the third socket, and a signal line for supplying the control power of the solenoid switches 410 and 420, separately.

A point at which the stub is connected (started) to the protection control module may be the inside of the protection control module 200 or a socket configured in the protection control module 200, so that a length of the stub from the multipoint bus to the protection control module is shortened or eliminated.

According to an embodiment of the present invention, in each of the integrated modules 110 and 120 of the inlet unit 10, the bridge sockets 310 and 320 for a dual structure of two internal communication ports, namely two serial communication ports 111 and 112 or 121 and 122, and internal communication are used to establish a complete dualization of the active/standby structure.

In order to configure a serial communication network between the first integrated module 110 and the second integrated module 120 and a plurality of the protection control modules 200, a multipoint bus is configured to cause the plurality of protection control modules to be connected. For example, the multipoint bus may be in accordance with the RS-485 standard. Each protection control module is connected in parallel to each signal line at any one point of the multipoint bus. The point where the stub is connected to the protection control module may be the inside of the unit socket 400 and may be configured inside the protection control module 200 or in a socket of the protection control module 200 according to an embodiment.

One side, that is, one end, of the multipoint bus is connected in common to the first serial communication port 111 of the first integrated module 110 and the first serial communication port 121 of the second integrated module 120, and the other side, that is, the other end of the multipoint bus, is connected in common to the second serial communication port 112 of the first integrated module 110 and the second serial communication port 122 of the second integrated module 120. The bridge sockets 310 and 320 are used respectively for the two common connections.

A first ring is configured to start from the first serial communication port 111 of the first integrated module 110 and return to the second serial communication port 112 of the first integrated module 110, and a second ring is configured to start from the first serial communication port 121 of the second integrated module 120 and return to the second serial communication port 122 of the second integrated module 120, in which a section including the point where at least the plurality of protection control modules are connected in the first ring and the second ring is shared to become a single multipoint bus. A section of the first bridge socket 310—each unit socket 400—the second bridge socket 320 is shared to become the single multipoint bus.

Since the independent ring is always established when the first integrated module 110 operates or the second integrated module 120 operates in the inlet unit 10, it is possible that communication is performed in two directions through two communication ports, even if the internal communication is disconnected.

Hereinafter, a dual operation of a motor control center system according to an embodiment of the present invention will be briefly described. For example, it will be described considering a case that the first integrated module 110 is an active module and the second integrated module 120 is a standby module.

The first integrated module 110 performs IP communication with the upper system 40 by using a single IP address known by the upper system 40 and communicates with each protection control module 200 in the motor control center through the first serial communication port 111. Herein, the second serial communication port 112 may not be used or may be used only for confirmation of receipt.

Figure 10:
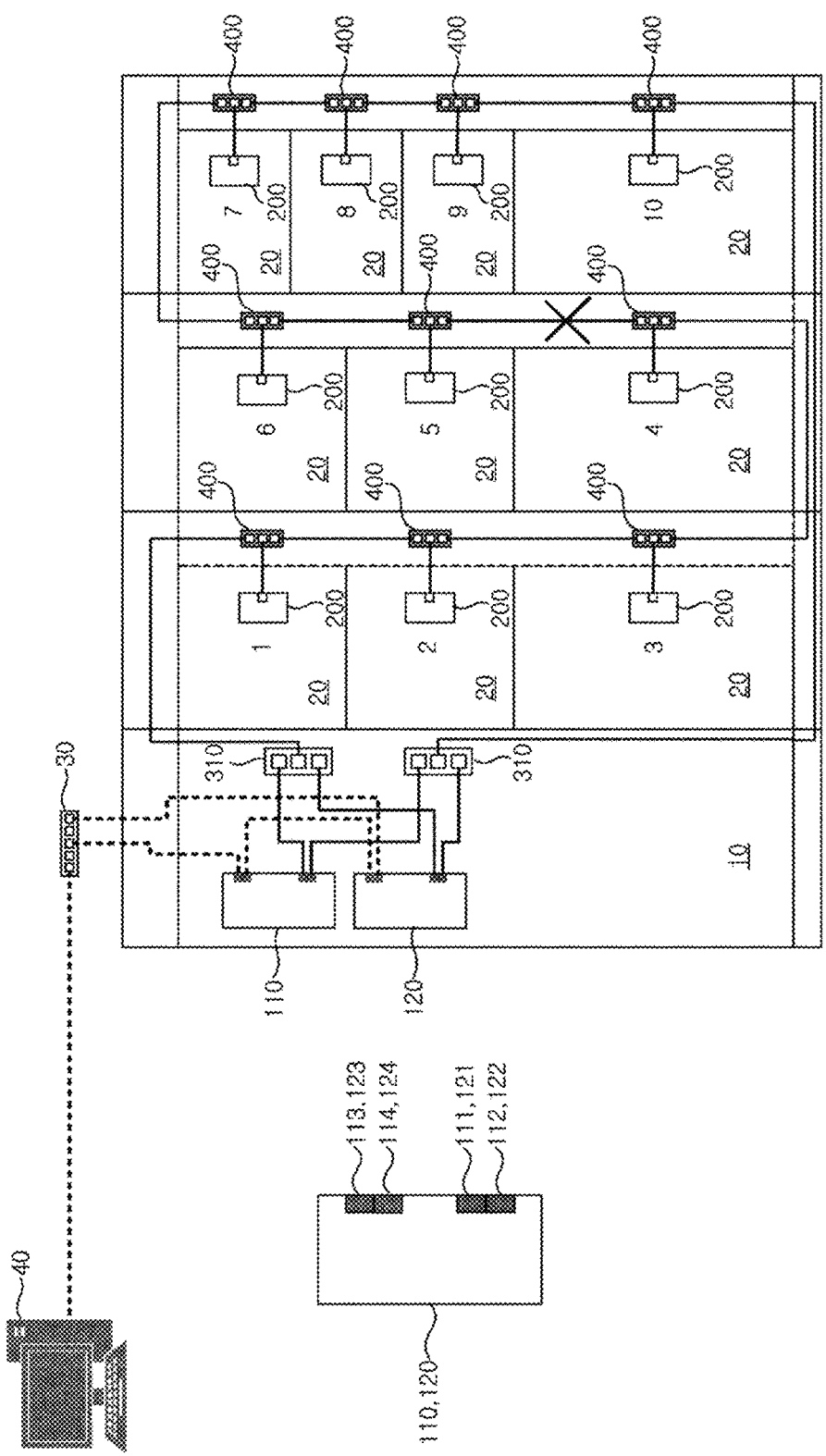
FIG. 10 is a view illustrating a state in which an internal communication line is disconnected in a configuration of FIG. 6.

Herein, as shown in FIG. 10, when a communication line between a protection control module No. 4 and a protection control module No. 5 is disconnected, it is possible to communicate with the protection control modules Nos. 1 to 4 using the first serial communication port 111 of the first integrated module 110, and it is possible to communicate with the protection control modules Nos. 5 to 10 using the second serial communication port 112 of the first integrated module 110.

Figure 5:
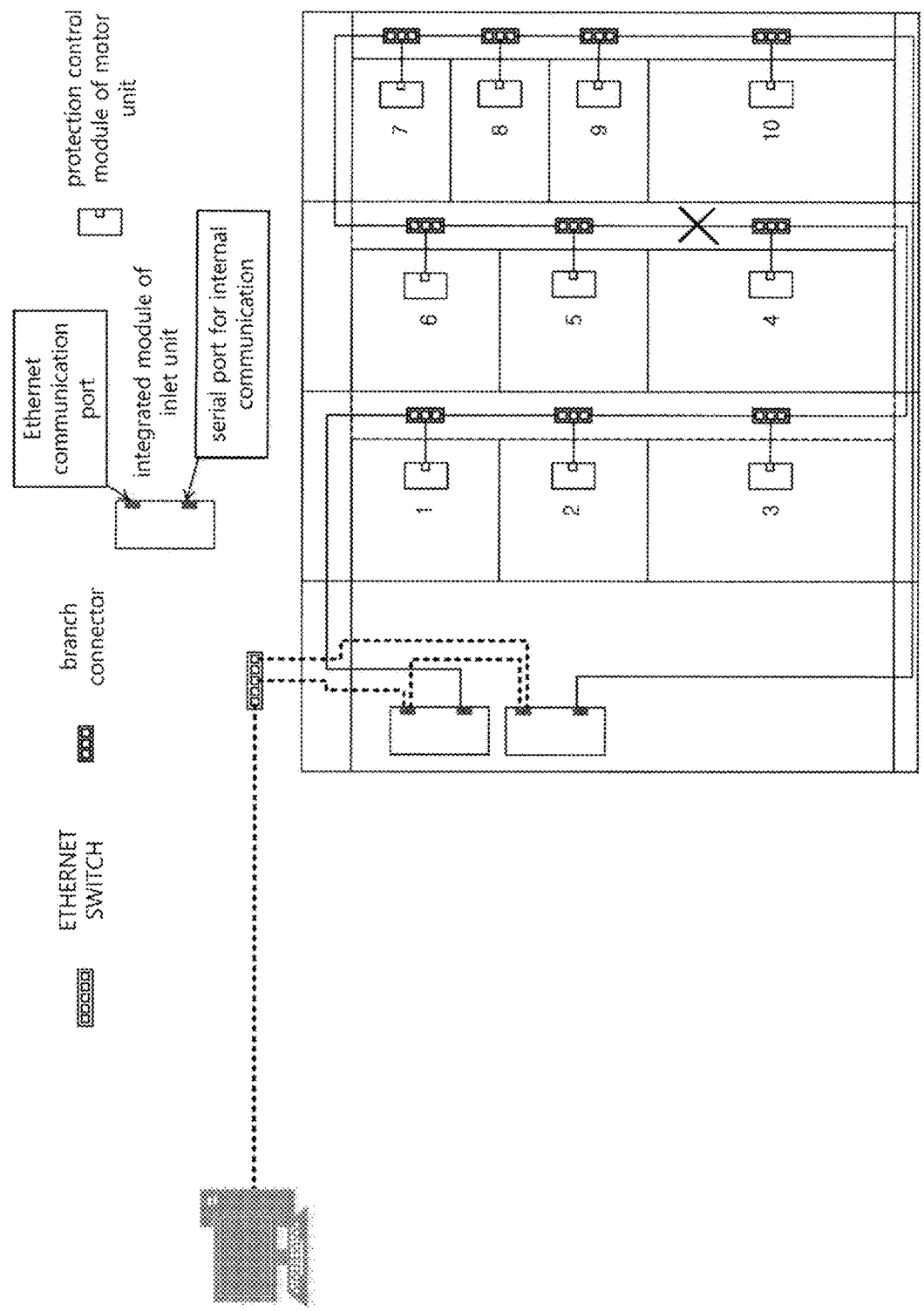
FIG. 5 is an example supposing a case where a disconnection occurs between a protection control module No. 4 and a protection control module No. 5 in a motor control center system of FIG. 4.

In the above-described configuration of FIG. 5, when the communication line is disconnected, the first integrated module and the second integrated module are required to perform communication in a shared manner, whereas in the configuration according to the above-mentioned embodiment of the present invention, it is possible to communicate with all the protection control modules using a single integrated module.

When the multipoint bus is disconnected at one point due to a disconnection of a communication line, a breakaway of a plug, or the like, the protection control module connected to one side of the multipoint bus on the basis of the disconnected point performs communication using the first serial communication port of the active module, and the protection control module connected to the other side of the multipoint bus performs communication using the second serial communication port of the active module.

Accordingly, even though the internal serial communication line is disconnected, it is possible to perform control and communication by using the single integrated module. Therefore, compared with the case where two integrated modules are shared as in the example shown in FIG. 5, there is an advantage of remarkably reducing the complexity of the process.

In addition, a situation in which a disconnection is generated in a communication line and at the same time an abnormality occurs in the first integrated module 110 may be assumed.

When an abnormality occurs in the first integrated module 110 which is an active module, the second integrated module 120, which is connected using Ethernet and performs heartbeat communication, detects the abnormality of the first integrated module 110 and performs IP communication with the upper system 40 by changing its own IP address to an IP address known by the upper system 40.

In addition, the second integrated module 120 also communicates with the respective protection control modules 200 through the first bridge socket 310 and the second bridge socket 320. However, since the disconnection has already occurred in the communication line between the protection control module No. 4 and the protection control module No. 5, as described above, it is possible to communicate with the protection control modules Nos. 1 to 4 using the first serial communication port 121 of the second integrated module 120 and communicate with the protection control modules Nos. 5 to 10 using the second serial communication port 122 of the second integrated module 120.

As described above, according to an aspect of the present invention, even if abnormalities occur simultaneously in the integrated module and the internal communication line, it is possible to overcome the abnormalities and perform normal operation, whereby there is an advantage that the integrated module and the internal communication line can be simultaneously operated in a dual structure. According to an aspect of the present invention, the internal communication can be easily implemented in a dual structure without requiring the protection control module be in a dual structure.

Although the characteristics of the present invention are applied between the integrated module of the motor control center and each of the protection control modules in the above description, such characteristics can be equally applied to any electric device that needs communication between the integrated module and the basic module.

The dual integrated module is installed in correspondence to the motor control center and is applied to a configuration that performs serial communication with a local operation plane (LOP) (corresponding to a unit module) corresponding to each motor. Herein, the LOP is configured instead of the protection control module in the above description. The integrated module of the motor control center and each LOP are connected through a serial communication network, wherein one end of the multipoint bus to which the LOP is connected is commonly connected to the first serial communication port of the first integrated module and the first serial communication port of the second integrated module, and the other end of the multipoint bus is commonly connected to the second serial communication port of the first integrated module and the second serial communication port of the second integrated module, in which the bridge sockets are used for the common connections.

Also, the integrated module is installed in correspondence with the distribution board (or the switchboard), and the integrated module is applied to a configuration for performing serial communication with measurement devices (unit module) corresponding to each branch line. Herein, the measuring device in the branching line is configured instead of the protection control module in the above description. The integrated module of the distribution board and the measuring devices of each branch line are connected to each other through a serial communication network. One end of the multipoint bus to which the measuring device in the branch line is connected is commonly connected to the first serial communication port of the first integrated module and the first serial communication port of the second integrated module, and the other end of the multipoint bus is commonly connected to the second serial communication port of the first integrated module and the second serial communication port of the second integrated module, in which bridge sockets are used for such common connections.

What is claimed is:

1. A motor control center system, comprising:
    a first integrated module and a second integrated module which are provided in correspondence with a motor control center and in a dual structure;
    a plurality of protection control modules which are provided in correspondence with respective motor units; and
    a multipoint bus to which the plurality of protection control modules are connected such that a serial communication network is formed between each of the first integrated module and second integrated module and the plurality of protection control modules,
    wherein one end of the multipoint bus is commonly connected to a first serial communication port of the first integrated module and a first serial communication port of the second integrated module, and the other end of the multipoint bus is commonly connected to a second serial communication port of the first integrated module and a second serial communication port of the second integrated module.

2. The system of claim 1,
    wherein a bridge socket is used for each of the two common connections, and
    the bridge socket includes at least three sockets, in which corresponding terminals used for serial communication in the at least three sockets are internally connected to each other.

3. The system of claim 1,
    wherein one of the first integrated module and the second integrated operates as an active module, and the other operates as a standby module,
    heartbeat communication is performed between the active module and the standby module, and
    when an abnormality occurs in the active module, a function of the active module is taken over by the standby module.

4. The system of claim 3,
    wherein the first integrated and the second integrated module perform IP communication with an upper layer, and
    when an abnormality occurs in the active module, an IP address of the standby module is switched to an IP address used by the active module.

5. The system of claim 3,
    wherein when the multipoint bus is disconnected at one point, the protection control modules connected to one side of the multipoint bus on the basis of the disconnected point perform communication using the first serial communication port of the active module, and the protection control modules connected to the other side of the multipoint bus perform communication using the second serial communication port of the active module.

6. The system of claim 1,
    wherein the protection control module is connected to the multipoint bus using a unit socket, and
    the unit socket includes a first socket and a third socket connected to both ends in a direction in which the multipoint bus is extended and a second socket connected to any one protection control module of the plurality of protection control modules, and switches between a first state in which corresponding terminals of the first socket and the third socket are connected directly to each other inside the unit socket and a second state in which corresponding terminals of the first socket and third socket are connected via the any one protection control module.

7. The system of claim 6,
wherein the switching between the first state and the second state is performed by a solenoid switch operated by a power source supplied from the protection control module.

8. A motor control center system, comprising:
a first integrated module and a second integrated module which are provided in correspondence with a motor control center and in a dual structure; and
a plurality of protection control modules which are provided in correspondence with respective motor units,
wherein a serial communication network is formed between each of the first integrated module and second integrated module and the plurality of protection control modules,
a first ring is configured to start from a first serial communication port of the first integrated module and return to a second serial communication port of the first integrated module, and a second ring is configured to start from a first serial communication port of the second integrated module and return to a second serial communication port of the second integrated module, and
a section including a point where the plurality of protection control modules are connected at least in the first ring, and the second ring is shared to become a single multipoint bus.

9. The system of claim 8,
wherein one of the first integrated module and the second integrated operates as an active module, and the other operates as a standby module,
heartbeat communication is performed between the active module and the standby module, and
when an abnormality occurs in the active module, a function of the active module is taken over by the standby module.

10. The system of claim 8,
wherein the protection control module is connected to the multipoint bus using a unit socket, and
the unit socket includes a first socket and a third socket connected to both ends in a direction in which the multipoint bus is extended and a second socket connected to any one protection control module of the plurality of protection control modules, and switches between a first state in which corresponding terminals of the first socket and the third socket are connected directly to each other inside the unit socket and a second state in which corresponding terminals of the first socket and third socket are connected via the any one protection control module.

11. A system for an electric device, the system comprising:
a first integrated module and a second integrated module which are provided in correspondence with the electric device and in a dual structure;
a plurality of unit modules which are provided in correspondence with respective basic units included in or connected to the electric device; and
a multipoint bus to which the plurality of unit modules are connected such that a serial communication network is formed between each of the first integrated module and the second integrated module and the plurality of unit modules,
wherein one end of the multipoint bus is commonly connected to a first serial communication port of the first integrated module and a first serial communication port of the second integrated module, and the other end of the multipoint bus is commonly connected to a second serial communication port of the first integrated module and a second serial communication port of the second integrated module.

12. The system of claim 11,
wherein a bridge socket is used for each of the two common connections, and
the bridge socket includes at least three sockets, in which corresponding terminals used for serial communication in the at least three sockets are internally connected to each other.

13. The system of claim 11,
wherein one of the first integrated module and the second integrated operates as an active module, and the other operates as a standby module,
heartbeat communication is performed by the active module and the standby module, and
when an abnormality occurs in the active module, a function of the active module is taken over by the standby module.

14. The system of claim 13,
wherein when the multipoint bus is disconnected at one point,
the unit modules connected to one side of the multipoint bus on the basis of the disconnected point perform communication using the first serial communication port of the active module, and the unit modules connected to the other side of the multipoint bus perform communication using the second serial communication port of the active module.

\* \* \* \* \*